United States Patent
Kimura

(10) Patent No.: US 8,310,546 B2
(45) Date of Patent: Nov. 13, 2012

(54) IMAGE PROCESSING APPARATUS ADAPTED TO RECOGNIZE OBJECT IN ACQUIRED IMAGE

(75) Inventor: Takayuki Kimura, Kariya (JP)

(73) Assignee: Denso Corporation, Kariya (JP)

( * ) Notice: Subject to any disclaimer, the term of this patent is extended or adjusted under 35 U.S.C. 154(b) by 443 days.

(21) Appl. No.: 12/576,315

(22) Filed: Oct. 9, 2009

(65) Prior Publication Data

US 2010/0091106 A1    Apr. 15, 2010

(30) Foreign Application Priority Data

Oct. 9, 2008   (JP) ................... 2008-262783

(51) Int. Cl.
*H04N 7/18* (2006.01)

(52) U.S. Cl. ........ 348/148; 348/149; 348/151; 348/155; 348/154; 382/103; 382/104; 382/172; 382/199; 382/195; 382/107

(58) Field of Classification Search .............. 348/148, 348/149, 151, 155, 154; 382/103, 104, 107, 382/172, 195, 199
See application file for complete search history.

(56) References Cited

U.S. PATENT DOCUMENTS

| | | | | |
|---|---|---|---|---|
| 5,736,756 A | * | 4/1998 | Wakayama et al. | 257/223 |
| 7,006,667 B2 | * | 2/2006 | Akutagawa | 382/104 |
| 7,095,432 B2 | * | 8/2006 | Nakayama et al. | 348/148 |
| 7,327,855 B1 | * | 2/2008 | Chen | 382/104 |
| 7,751,625 B2 | * | 7/2010 | Ulrich et al. | 382/199 |
| 2009/0034799 A1 | | 2/2009 | Nishida et al. | |

FOREIGN PATENT DOCUMENTS

| | | |
|---|---|---|
| JP | 07-334800 | 12/1995 |
| JP | 08-016793 | 1/1996 |
| JP | 08-261756 | 10/1996 |
| JP | 09-288737 | 11/1997 |
| JP | 11-187288 | 7/1999 |
| JP | 2000-242800 | 9/2000 |
| JP | 2006-310999 | 11/2006 |
| JP | 2006-314060 | 11/2006 |
| JP | 2007-179386 | 7/2007 |
| JP | 2007-249681 | 9/2007 |
| JP | 2007-298376 | 11/2007 |
| WO | WO 2007-111220 | 10/2007 |

OTHER PUBLICATIONS

Japanese Office Action dated Sep. 7, 2010 issued in corresponding Japanese Application No. 2008-262783, with English Translation.

\* cited by examiner

*Primary Examiner* — Shawn An

(74) *Attorney, Agent, or Firm* — Nixon & Vanderhye, P.C.

(57) ABSTRACT

An image processing apparatus communicates with an image acquisition apparatus provided with an image acquisition region comprising light-shielded pixels and effective pixels. Data of an image are acquired based on output signals from the effective pixels. An edge of an object is extracted in the acquired image data using a preset edge threshold, and the object is recognized based on the extracted edge. Output signals are acquired from the light-shielded pixels and a degree of variations in noise contained in the output signals from the effective pixels is estimated based on the output signals acquired. The edge threshold is set based on the degree of variations in noise which is estimated, such that the noise having a level which exceeds the edge threshold occurs at a probability lower than a preset value.

9 Claims, 3 Drawing Sheets

IMAGE PROCESSING APPARATUS ADAPTED TO RECOGNIZE OBJECT IN ACQUIRED IMAGE

CROSS-REFERENCE TO RELATED APPLICATION

This application is based on and claims the benefit of priority from earlier Japanese Patent Application No. 2008-262783 filed Oct. 9, 2008, the description of which is incorporated herein by reference.

BACKGROUND OF THE INVENTION

1. Technical Field of the Invention

The present invention relates to an image processing apparatus which is able to recognize an object on acquired images by extracting change points of signal levels, based on the signals inputted from an on-vehicle camera which is provided with solid-state image acquisition elements.

2. Related Art

Lane control systems that have been known include one which performs a white line recognition process. In the white line recognition process, white line portions are extracted (recognized) from an image of the road surface in the forward direction of the vehicle, which image is acquired by an on-vehicle camera (hereinafter referred to as an "acquired image"). With this process, the position of each white line with respect to the vehicle is estimated. When it is determined that the vehicle has a high possibility of deviating from the traveling lane, on the basis of the positions of the white lines and the behaviors of the vehicle, the driver is warned or traveling control is effected to keep the lane.

On-vehicle cameras in general are represented by such image acquiring devices as CCD (charge-coupled device) imaging sensors and CMOS (complementary metal oxide semiconductor) imaging sensors. Such an imaging device is adapted to photoelectrically convert an optical subject image, which is imaged via a lens, into electric charges using a plurality of solid-state image acquisition elements (hereinafter just referred to as "image acquisition elements") arrayed on a substrate. Then, the output voltage of the image acquisition elements are adapted to be read out in the scanning direction and the read-out signals (hereinafter referred to as "luminance signals") are adapted to be outputted to a control apparatus.

The white line recognition process is performed, as shown in FIG. 4A, based on the luminance signals inputted from the on-vehicle camera. Here, the points where the signal levels of the luminance signals change with level differences equal to or more than a predetermined threshold, are referred to as pixel points (edges) P. Further, of the regions each sandwiched by two adjacent edges P, the regions on the side where the levels of the luminance signals are high are referred to as regions H. In the white line recognition process, the pixel points P are extracted for every horizontal line in an acquired image X, and the pixel points P that belong to the regions H are set as white line candidate points. Then, the position of each white line is estimated based on the linkage between the white line candidate points in the entire acquired image. Reference may be made to Japanese Patent Application Laid-Open Publication No. 2000-242800, for example.

SUMMARY OF THE INVENTION

In the white line recognition process described above, the threshold for extracting the edges (i.e., contours) (hereinafter referred to as an "edge threshold") is required to be set to a value smaller than the level differences (contrast) between the pixel points corresponding to white line portions and the pixel points corresponding to portions other than the white line portions (nonlinear portions) in the imaged road surface. In other words, as shown in FIG. 4B, if the edge threshold is preset to a large value, there is a high probability that the edges in a low-contrast acquired image cannot be extracted, preventing proper estimation of the position of each white line.

Further, in the white line recognition process, the edge threshold is required to be se to a value larger than the level of the noise (internal noise) induced by image acquiring conditions, such as inside temperature of the imaging device.

However, in the conventional white line recognition process, the edge threshold has usually been a fixed value so as to cope with the contrast variation under certain image acquiring conditions. Therefore, for example, in the case where free electrons in the image acquisition elements are increased with the increase of the temperature in the imaging device and where the internal noise included in the luminance signals is increased, the noise level will exceed the edge threshold, as shown in FIG. 4C. Therefore, the conventional white line recognition process has suffered from a problem of raising the probability of erroneously extracting edges.

A measure that can be taken may be providing a sensor for detecting the internal temperature of the imaging device, and storing the relationship between the internal temperature and the internal noise in the control apparatus, so that the edge threshold can be set according to the temperature detected by the sensor. However, the configuration based on this measure has suffered from a problem of not being able to cope with the dynamically changing internal noise which is caused by the individual differences between the image acquisition elements.

In order to solve the problems described above, the present invention has an object of providing an image processing apparatus which is able to properly recognize an object under the conditions where the object appears on a low-contrast acquired image.

In order to achieve the above object, the present invention provides an image processing apparatus that communicates with an image acquisition apparatus provided with an image acquisition region so comprising both a light-shielded region where a plurality of light-shielded solid-state image acquisition elements are arrayed as light-shielded pixels and a non-light-shielded region where a plurality of exposed solid-state image acquisition elements are arrayed two-dimensionally as effective pixels for acquiring an image of an object. The image processing apparatus comprises image data acquiring means for acquiring data of the image based on output signals from the effective pixels which are provided by the solid-state image acquisition elements in the non-light-shielded region of the image acquisition apparatus; edge extracting means for extracting an edge in the image, the edge being composed of pixels whose values differ from values of adjacent pixels in the effective pixels by differences each being equal to or larger than a preset edge threshold; object recognizing means for recognizing the object based on the extracted edge; output acquiring means for acquiring output signals from the tight-shielded pixels which are provided by the solid-state image acquisition elements in the light-shielded region; noise estimating means for estimating a degree of variations in noise contained in the output signals from the effective pixels, based on the output signals acquired by the output acquiring means; and threshold setting means for setting the edge threshold based on the degree of variations in noise which is estimated by the noise estimating means, such that the noise having a level which exceeds the edge threshold occurs at a probability lower than a preset value.

Specifically, if the plurality of solid-state image acquisition elements (hereinafter referred to as "image acquisition elements") have a uniform quality, of the output signals of the image acquisition elements in the non-light-shielded and light-shielded regions, the output signals (internal noise) induced by the dynamic internal variation of the image acquisition elements will be uniformed. The dynamic internal variation here may be, for example, the increase in the free electrons caused by the increase in temperature. In this case, the signals from the image acquisition elements (light-shielded pixels or shaded pixels) in the light-shielded region (or shaded region) will not include components other than the internal noise. The image processing apparatus of the present invention is provided putting a focus on this fact.

In the image processing apparatus of the present invention, therefore, the degree of variation in the internal noise (a degree of variations in noise) can be easily estimated based on the signals from the light-shielded pixels. Thus, by setting the edge threshold based on the degree of noise variation, the probability that the noise levels in the output signals from the effective pixels will exceed the edge threshold, that is, the probability of erroneously extracting edge portions (hereinafter referred to an "edge extraction error rate") can be suppressed and permitted to fall within a tolerable range.

Therefore, with the image processing apparatus of the present invention, the edge threshold can be set to a minimum value so that the edge extraction error rate can be suppressed and permitted to fall within a tolerable range, under the conditions where the level differences (contrast) in the output signals (acquired image) are small in the entire effective pixels. Thus, an object on a low-contrast acquired image can be properly recognized.

Preferably the noise estimating means is configured to estimate, as the degree of variations in noise, a standard deviation of levels of the output signals from the light-shielded pixels. With this image processing apparatus, the threshold setting means is permitted to set the edge threshold based on the standard deviation in the output signal levels of the light-shielded pixels. Accordingly, the distribution (dispersion) of the noise levels contained in the output from the effective pixels can be reliably reflected to the setting of the edge threshold.

Still preferably the threshold setting means is configured to set the edge threshold at a value which is calculated by multiplying the standard deviation by a magnification larger than 1 which is previously set. With this image processing apparatus, the probability of erroneously extracting edge portions (edge extraction error rate) can be further suppressed (e.g., when the magnification is set to "3", the error rate can be rendered to be about 0.3%). Thus, an object on an acquired image can be more properly recognized.

It is preferred that the threshold setting means is configured to set the edge threshold at a value which is smaller than a difference between a maximum and a minimum among levels of the output signals from the effective pixels.

It is also preferred that the output acquiring means is configured to acquire the output signals from the light-shielded pixels every time the image data acquiring means acquires the output signals from the effective pixels, and the threshold setting means is configured to set the edge threshold every time the output acquiring means acquires the output signals from the light-shielded pixels.

With the image processing apparatus configured in this way, the threshold setting means is permitted to set the edge threshold every time the output signals from the effective pixels is acquired. Accordingly, a more accurate measure can be taken for the dynamic internal variation in the solid-state image acquisition elements.

For example, the image acquisition apparatus is mounted in a vehicle so as to allow the image acquisition apparatus to acquire forward images of a road on which the vehicle runs, and the object is composed of white lines on the road. Thus, when the object is the white lines on the road surface whose image is acquired by the image acquisition apparatus, the image processing apparatus of the present invention can be properly used as a white line recognition processing apparatus.

DETAILED DESCRIPTION OF THE PREFERRED EMBODIMENTS

With reference to the accompanying drawings, hereinafter will be described an embodiment of the present invention.

Figure 1:
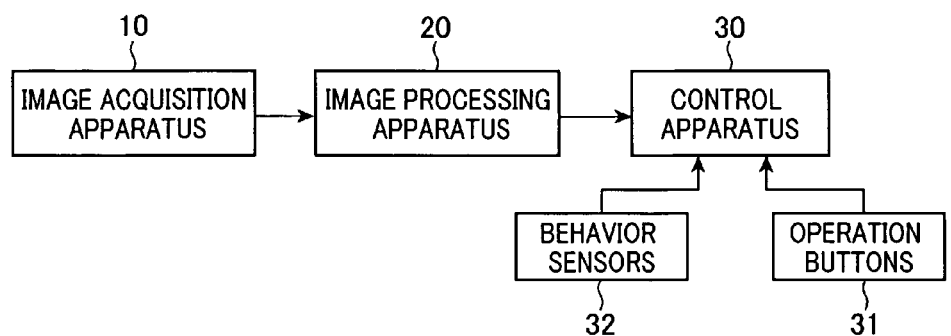
FIG. 1 is a block diagram illustrating a configuration of a lane control system including an image processing apparatus of the present invention, which system is applied as an on-vehicle system.

FIG. 1 is a block diagram illustrating a lane control system 1 including an image acquisition apparatus of the present invention, which system is applied as an on-vehicle system.

As shown in FIG. 1, the lane control system 1 equipped in a vehicle includes an image acquisition apparatus 10, an image processing apparatus 20 and a control apparatus 30. The image acquisition apparatus 10 is set to the vehicle so that the road surface in the forward direction of the vehicle is included in the image acquiring range. The image processing apparatus 20 processes an image acquired by the image acquisition apparatus 10 (hereinafter referred to as an "acquired image") in order to extract (recognize) white line portions of the road surface from the image. The control apparatus 30 performs various vehicle controls using the results of the process performed by the image processing apparatus 20. The image acquisition apparatus 10, the image processing apparatus 20 and the control apparatus 30 may be mutually connected via lines dedicated to these apparatuses, or may be mutually connected via an in-vehicle LAN (local area network).

The control apparatus 30 is configured by being connected to an operation buttons 31 and various behavior sensors 32. The operation buttons 31 receive various operation signals from the user. The behavior sensors 32, such as a yaw rate sensor and a steering sensor, detect the behaviors of the vehicle.

Upon input of a command for starting control, via the operation buttons 31, the control apparatus 30 outputs a start command to the image processing apparatus 20 to start up the process. At the same time, the control apparatus 30 acquires the results of detection (sensor information) from the behavior sensors 32. Then, the control apparatus 30 determines as to the vehicle's possibility of deviating from the white line portions (i.e. deviating from the traveling lane) on the road surface based on the sensor information and white line information (which will be described later) inputted from the image acquisition apparatus 20. If it is determined that the vehicle has a high possibility of deviating from the white line portions, the control apparatus 30 outputs alarm beep sound, or adds steering torque in the direction for enabling the vehicle to return to the traveling lane.

Further, upon input of a command for stopping control, via the operation buttons 31, the control apparatus 30 is adapted to output a stop command to the image processing apparatus 20 to terminate the process.

Figure 2:
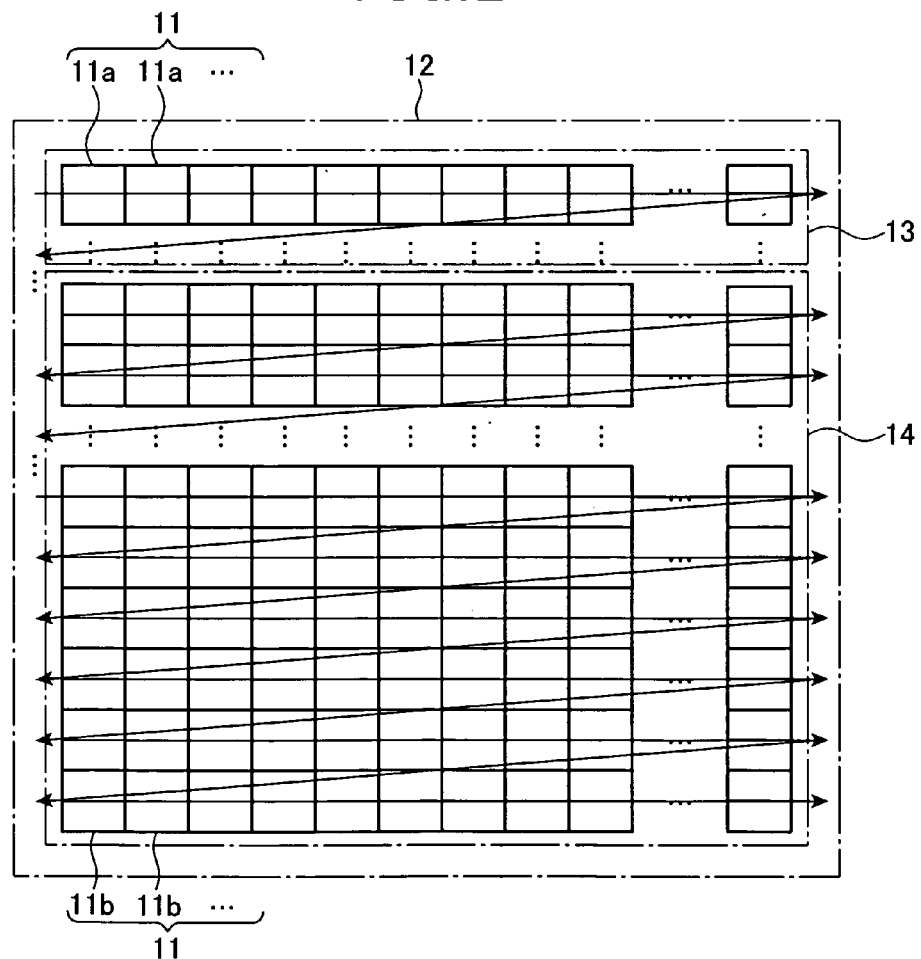
FIG. 2 is an explanatory view illustrating a scanning direction in an image acquisition region.

As shown in FIG. 2, the image acquisition apparatus 10 has an image acquisition region 12 where a plurality of solid-state image acquisition elements (hereinafter just referred to as "image acquisition elements") 11 are two-dimensionally arranged on a substrate. The image acquisition apparatus 10 is configured to read out voltage signals by sequentially scanning along the horizontal lines in the image acquisition region 12 and to output the voltage signals to the image processing apparatus 20.

The image acquisition elements 11 are well-known elements, each of which holds electric charges by photoelectrically converting an optical subject image that has been imaged thereon through a lens. The image acquisition region 12 is divided into an optical black region 13 as a light-shielded region consisting of a plurality of image acquisition elements 11 which are shielded from light by being covered with an aluminum film, and an effective pixel region 14 as a non-light-shielded region consisting of a plurality of exposed image acquisition elements 11.

In other words, the image acquisition apparatus 10 is configured to output image signals consisting of two types of voltage signals to the image processing apparatus 20. Voltage signals of one of the two types serve as a reference of black portions in the acquired image (hereinafter referred to as "light-shielded signals") via light-shielded pixels 11a, i.e. the image acquisition elements 11 of the optical black region 13. Voltage signals of the other of the two type are actually used for the acquired image (hereinafter referred to as "luminance signals") via effective pixels 11b, i.e. the image acquisition elements 11 of the effective pixel region 14.

Also, the image acquisition apparatus 10 is configured to perform exposure control, such as the adjustment of lens diaphragm or shutter open time, according to exposure commands (parameters), which will be described later, from the image processing apparatus 20, so that appropriate contrast can be achieved in the acquired image.

The image processing apparatus 20 is mainly configured by a well-known microcomputer consisting such as of a CPU, ROM, RAM and I/O, not shown though. Of these components, the CPU is configured to use the RAM as an operation area to execute a white line recognition process, which will be described later, based on a program stored in the ROM. The ROM stores a control table for indicating parameters (hereinafter referred to as "camera control values") correlated to an average luminance value (an average brightness value or an average signal intensity) of the entire acquired image. The parameters play a roll of adjusting the amount of light which is illuminated on the image acquisition elements 11 when the image acquisition apparatus 10 produces an acquired image. The RAM includes a set-value memory so region for temporarily holding camera control values set by the CPU, and a signal memory region for temporarily holding image signals inputted from the image acquisition apparatus 10.

Figure 3:
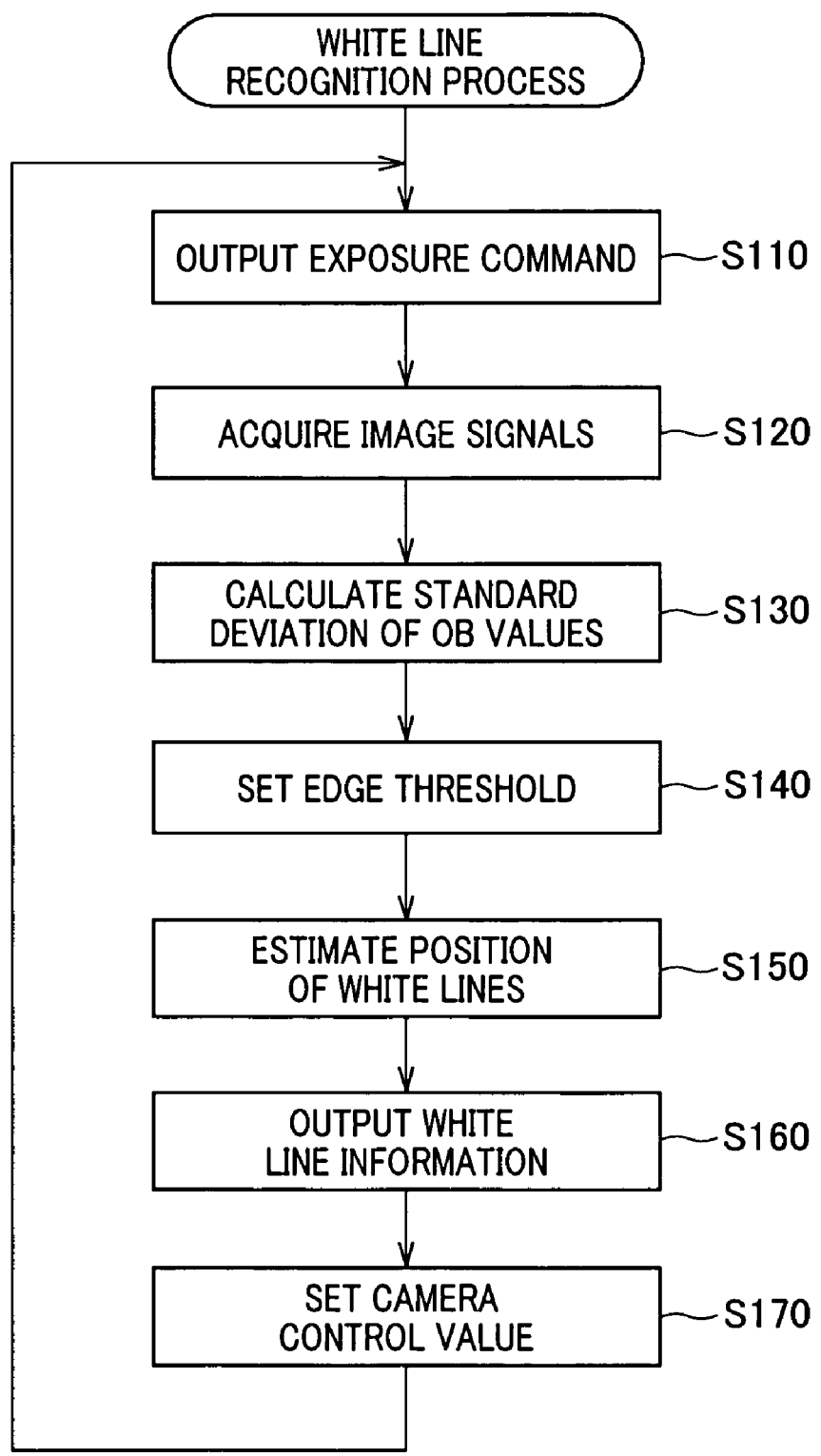
FIG. 3 is a flow diagram specifically illustrating a white line recognition process executed by a CPU of the image processing apparatus.
Figure 4A:
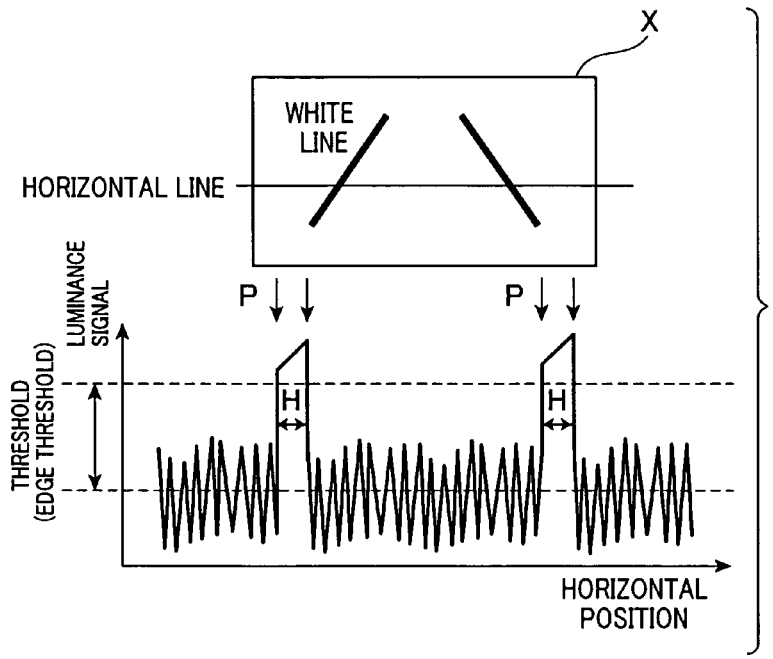
FIGS. 4A to 4C are graphs each illustrating a signal level of every pixel point (in the horizontal direction of an acquired image) in the white line recognition process according to the prior art.
Figure 4B:
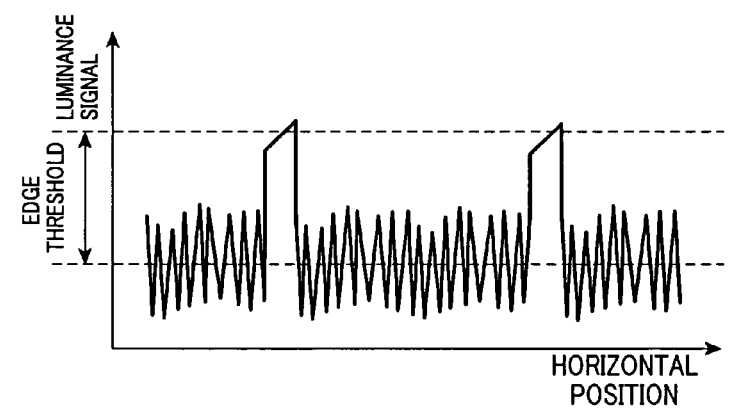
Figure 4C:
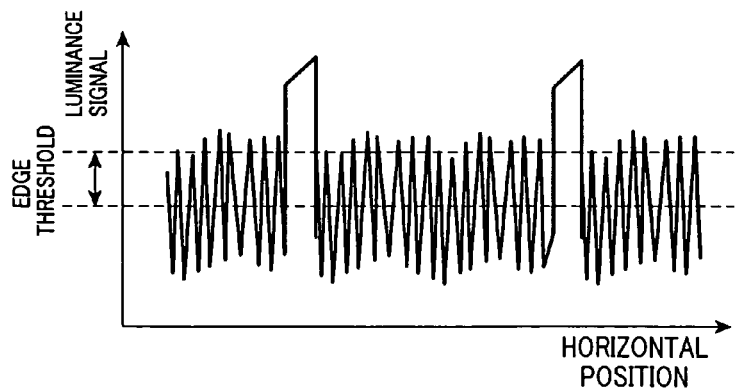

FIG. 3 is a flow diagram illustrating the details of the white line recognition process executed by the CPU of the image processing apparatus 20. This process is started upon input of a start command from the control apparatus 30 (or upon switch-on of an IC (ignition) switch of the vehicle), and repeatedly executed in a predetermined periodic manner until a stop command is inputted from the control apparatus 30.

First, upon start of the present process, an exposure command is outputted from the image processing apparatus 20 to the image acquisition apparatus 10 so that the image acquisition apparatus 10 can perform exposure control according to the camera control values held in the set-value memory region of the RAM (step S110). It should be appreciated that the camera control value preset as an initial value (e.g. approximately an intermediate value in the adjustment range of the exposure control performed by the image acquisition apparatus 10) is used as the initially outputted exposure command in the present process.

Subsequently, the image signals inputted from the image acquisition apparatus 10 are stored (held) in the signal memory region of the RAM (step S120). Then, of the image signals acquired in this way, the light-shielded signals are subjected to calculation. Specifically, a standard deviation a is calculated for the light-shielded pixel values (hereinafter referred to as "Os values"), i.e. the signal levels of the light-shielded signals (step S130).

Then, the standard deviation σ calculated at step S130 is multiplied by a predetermined standard magnification and the resultant value is set as a threshold for extracting edges (i.e., contours) (hereinafter such a threshold is referred to as an "edge threshold") (step S140). The edges refer to pixel points (points corresponding to the effective pixels 11b on an acquired image) where the effective pixel values, i.e, the signal levels of the luminance signals among the image signals acquired at step S120, vary with level differences equal to or more than the edge threshold set at step S140. In the present embodiment, the standard magnification is variably set according to the difference between the maximum and minimum values (maximum contrast) of the effective pixel values, so as to fall within a range where the edge threshold is smaller than the maximum contrast.

In this way, the edges (the edges where the effective pixel values vary with level differences equal to or more than the edge threshold) are extracted for every horizontal line in an acquired image, based on the luminance signals among the image signals acquired at step S120 and the edge threshold set at step S140. Then, the pixel points that belong to regions on the side where the effective pixel values are large, among the regions each sandwiched by two adjacent edges, are set as white line candidate points. Then, the position of each white line is estimated (recognized) based on the linkage of the white line candidates in the entire acquired image (step S150).

Finally, the white line information indicating the position of each white line recognized at step S150 is outputted to the control apparatus 30 (step S160). At the same time, the camera control value corresponding to the entire brightness of the acquired image is set (step S170), and then control is transferred to step S110. At step S170, an average luminance of the entire acquired image is calculated based on the image signals acquired at step S120, and a camera control value corresponding to the value resulting from the calculation is read out from the control table stored in the ROM to store (hold) the camera ee control value in the set-value memory region of the RAM. To additionally explain, the average luminance of the entire acquired image is calculated by correcting the effective pixel values using the light-shielded pixel values (black portions) as reference levels (black correction), and averaging the corrected effective pixel values.

In the embodiment described above, step S120 corresponds to the output acquiring means and the light-shielded pixel acquiring means, step S130 corresponds to the noise estimating means, step S140 corresponds to the threshold setting means and step S150 corresponds to the edge extracting means.

As described above, in the image processing apparatus 20 of the present embodiment, focus is put on the fact that the uniform quality between the light-shielded pixels 11a and the effective pixels 11b will lead to the uniformity between the standard deviation in the output signal levels (OB values) of the light-shielded signals and the standard deviation in the noise (internal noise) components contained in the luminance signals. Thus, the degree of variation in the internal noise (noise variation) estimated on the basis of the standard deviation of the OB values is reflected to the setting of the edge threshold.

Accordingly, according to the image processing apparatus 20 of the present embodiment, a minimum edge threshold can be set under the conditions where the level differences (contrast) in the output signals (acquired image) are small in the entire effective pixels. With such a minimum edge threshold, the probability of erroneously extracting an edge (edge extraction error rate) can be suppressed and permitted to fall within a tolerable range. Further, with the minimum edge threshold, an object on a low-contrast acquired image can be properly recognized.

In the white line recognition process, a camera control value corresponding to the average luminance (brightness) of the entire acquired image is calculated on the basis of the image signals acquired from the image acquisition apparatus 10. Then, a command is outputted to the image acquisition apparatus 10 to allow the image acquisition apparatus 10 to perform the exposure control according to the calculated camera control value. Therefore, the image signals produced by the image acquisition apparatus 10 can be used for both of the process of recognizing the white line on a road surface and the so process of setting a control value for performing the exposure control. As a result, the processing efficiency of the entire lane control system 1 can be enhanced.

The lane control system 1 is configured so that the image processing apparatus 20 can start up or terminate the white line recognition process, being ganged with the control apparatus 30. Therefore, the image processing, when not necessary, can be omitted to thereby suppress power consumption.

OTHER EMBODIMENTS

An embodiment of the present invention has so far been described. However, the present invention is not intended to be limited to the above embodiment, but may be implemented in various modes within a scope not departing from the spirit of the present invention.

For example, the edge threshold in the white line recognition process in the above embodiment has been set to a value which is obtained by multiplying the standard deviation a of the OB values with a standard magnification. This however is not intended to impose a limitation. The edge threshold may be set to a value indicative of the degree of variation of the OB values (and thus the degree of variation in the noise levels contained in the luminance signals). For example, the edge threshold may be set to a value obtained by using an average deviation, or the like.

The lane control system 1 of the above embodiment has been configured so that the image acquisition apparatus 10 may perform the exposure control following the exposure command issued from the image processing apparatus 20. Alternative to this, the exposure control may be ensured to be performed by the image acquisition apparatus 10, per se, according to the ambient brightness (e.g. average luminance of the entire acquired image). The image acquisition apparatus 10 may be configured by being provided with a color filter for producing a color image.

The image acquisition apparatus 10 of the above embodiment has been configured to acquired images of the road surface in the forward direction of the vehicle. This however is not intended to impose a limitation. For example, the image acquisition apparatus 10 may be configured such that images of the preceding vehicle are acquired, or the images of the road surface in the rearward direction of the vehicle are acquired. Further, the image acquisition apparatus 10 may not be limited to the use in a vehicle, but may be set up in an architectural structure, such as a house and a building, to monitor suspicious individuals.

Similarly, the image processing apparatus 20 is not limited to the use for recognizing the white line portions on a road surface, but may be configured to recognize other vehicles, walls or fences, architectural structures as well as persons, using a technique such as of known pattern matching.

The control apparatus 30 of the above embodiment has been configured to output alarm beep sound or to add steering torque in the direction for enabling the vehicle to return to the traveling lane, in the case where the vehicle is determined as having a high possibility of deviating from the white line portions. This however is not intended to impose a limitation. For example, the control apparatus 30 may be configured to operate the brake pedal and the seatbelt pretensioner, in the case where the vehicle is determined as having a high possibility of colliding against an obstacle, such as other vehicle.

The present invention may be embodied in several other forms without departing from the spirit thereof. The embodiments described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An image processing apparatus comprising:
a processor configured to at least perform:
an image data acquisition for acquiring, from an image acquisition apparatus provided with an image acquisition region comprising both a light-shielded region where a plurality of light-shielded solid-state image acquisition elements are arrayed as light-shielded pixels and a non-light-shielded region where a plurality of exposed solid-state image acquisition elements are arrayed two-dimensionally as effective pixels for acquiring an image of an object, data of the image based on output signals from the effective pixels which are provided by the solid-state image acquisition elements in the non-light-shielded region of the image acquisition apparatus;
an output acquisition for acquiring output signals from the light-shielded pixels which are provided by the solid-state image acquisition elements in the light-shielded region;
a noise estimation for estimating a degree of variations in levels of noise contained in the output signals from the effective pixels, based on the output signals acquired by the output acquisition;

a threshold setting for setting the edge threshold based on both the degree of variations in noise which is estimated by the noise estimation and a maximum contrast which is set as a difference between a maximum and a minimum among levels of the output signals from the effective pixels based on the data acquired by the image acquisition;

an edge extraction for extracting an edge in the image among the data of the image acquired by the image data acquisition, the edge being composed of pixels whose values has a difference equal to or large than the edge threshold between adjacent pixels in the effective pixels, the edge threshold being set by the threshold setting; and an object recognition for recognizing the object based on the edge extracted by the edge extraction, wherein the threshold setting is configured to set the edge threshold at a value falling into a range i) which is lower than the maximum contrast and ii) which allows the levels of the noise exceeding the edge threshold to occur at a probability lower than a preset value.

2. The image processing apparatus of claim 1, wherein the noise estimation is configured to estimate, as the degree of variations in noise, a standard deviation of levels of the output signals from the light-shielded pixels.

3. The image processing apparatus of claim 2, wherein the threshold setting is configured to set the edge threshold at a value which is calculated by multiplying the standard deviation by a magnification larger than 1 which is previously set.

4. The image processing apparatus of claim 3, wherein
the output acquisition is configured to acquire the output signals from the light-shielded pixels every time the image data acquisition acquires the output signals from the effective pixels, and the threshold setting is configured to set the edge threshold every time the output acquisition acquires the output signals from the light-shielded pixels.

5. The image processing apparatus of claim 3, wherein
the image acquisition apparatus is mounted in a vehicle so as to allow the image acquisition apparatus to acquire forward images of a road on which the vehicle runs, and the object is composed of white lines on the road.

6. The image processing apparatus of claim 2, wherein
the output acquisition is configured to acquire the output signals from the light-shielded pixels every time the image data acquisition acquires the output signals from the effective pixels, and the threshold setting is configured to set the edge threshold every time the output acquisition acquires the output signals from the light-shielded pixels.

7. The image processing apparatus of claim 2, wherein
the image acquisition apparatus is mounted in a vehicle so as to allow the image acquisition apparatus to acquire forward images of a road on which the vehicle runs, and the object is composed of white lines on the road.

8. The image processing apparatus of claim 1, wherein
the output acquisition is configured to acquire the output signals from the light-shielded pixels every time the image data acquisition acquires the output signals from the effective pixels, and the threshold setting is configured to set the edge threshold every time the output acquisition acquires the output signals from the light-shielded pixels.

9. The image processing apparatus of claim 1, wherein
the image acquisition apparatus is mounted in a vehicle so as to allow the image acquisition apparatus to acquire forward images of a road on which the vehicle runs, and the object is composed of white lines on the road.

* * * * *